US009228590B2

(12) United States Patent
Nachtergaele et al.

(10) Patent No.: US 9,228,590 B2
(45) Date of Patent: Jan. 5, 2016

(54) METHOD FOR CONTROLLING A COMPRESSOR ELEMENT OF A SCREW COMPRESSOR

(75) Inventors: Johan Nachtergaele, Brasschaat (BE); Simon Peter G. De Bock, Stekene (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 375 days.

(21) Appl. No.: 13/807,818

(22) PCT Filed: Jul. 1, 2011

(86) PCT No.: PCT/BE2011/000039
§ 371 (c)(1),
(2), (4) Date: Dec. 31, 2012

(87) PCT Pub. No.: WO2012/000066
PCT Pub. Date: Jan. 5, 2012

(65) Prior Publication Data
US 2013/0101390 A1    Apr. 25, 2013

(30) Foreign Application Priority Data

Jul. 2, 2010    (BE) .................................. 2010/0397

(51) Int. Cl.
F04D 27/00 (2006.01)
F04C 18/16 (2006.01)
(Continued)

(52) U.S. Cl.
CPC ................ *F04D 27/00* (2013.01); *F04C 18/16* (2013.01); *F04C 29/0021* (2013.01); *F04D 27/02* (2013.01); *F16C 32/0476* (2013.01); *F04C 2240/52* (2013.01); *F04C 2270/044* (2013.01)

(58) Field of Classification Search
CPC ................ F04C 18/16; F04C 29/0021; F04C 2270/044; F04C 2240/52; F04D 27/00; F04D 27/02; F16C 32/0476
USPC ....................................... 417/410.4; 310/90.5
See application file for complete search history.

(56) References Cited

U.S. PATENT DOCUMENTS 5,197,861 A * 3/1993 Maruyama et al. ............. 417/42
6,927,517 B2 * 8/2005 Brunet et al. ................. 310/90.5
(Continued)

FOREIGN PATENT DOCUMENTS

BE        1 013 221 A3    11/2001
EP        0 867 628 A2     9/1998
(Continued)

OTHER PUBLICATIONS

International Search Report and Written Opinion for PCT/BE2011/000039, Dec. 18, 2012.
(Continued)

*Primary Examiner* — Charles Freay
*Assistant Examiner* — Philip Stimpert
(74) *Attorney, Agent, or Firm* — Bacon & Thomas, PLLC

(57) ABSTRACT

Method for controlling a compressor element of a screw compressor, where the compressor element has a housing with two meshing helical rotors supported in the housing in the axial direction using at least one axial bearing. The method has a process A and/or a process B, where process A has a first step of switching on a first magnet during start-up of the compressor element, such that the magnet exerts a force on the rotor that is directed from an outlet side to an inlet side, and of switching off this first magnet during nominal operation of the compressor element; and where process B has a first step of keeping a second magnet switched off during start-up of the compressor element, and switching on this second magnet during nominal operation of the compressor element, such that this second magnet exerts a force that is directed from the inlet side to the outlet side.

27 Claims, 8 Drawing Sheets

(51) Int. Cl.
*F04C 29/00* (2006.01)
*F16C 32/04* (2006.01)
*F04D 27/02* (2006.01)

(56) References Cited

U.S. PATENT DOCUMENTS

2002/0192096 A1 12/2002 Segers et al.
2006/0012258 A1 1/2006 Sun et al.
2009/0260388 A1 10/2009 Nakazeki et al.

FOREIGN PATENT DOCUMENTS

GB 2 376 505 A 12/2002
SE 8 701 977 L 11/1988

OTHER PUBLICATIONS

Database extraction XP 002625344 on SE8701977 (Nov. 15, 1988) (2 pages from ISR).

* cited by examiner

METHOD FOR CONTROLLING A COMPRESSOR ELEMENT OF A SCREW COMPRESSOR

FIELD OF THE INVENTION

The present invention relates to a method for controlling a compressor element for a screw compressor.

BACKGROUND

As is known a compressor element of a screw compressor contains a housing with two meshing rotors, of which the helical parts are called the rotor bodies.

As is known, one of the rotors is constructed in the form of a male rotor with lobes, while the other rotor is constructed in the form of a female rotor with grooves, in which the lobes of the male rotor mesh in a known way.

Each rotor has a shaft whereby the rotor is supported in the housing by means of axial and radial bearings.

Generally one of these rotors is driven by a motor via a drive gearwheel on the shaft of the rotor, and in turn this rotor drives the other rotor, via a gearwheel transmission formed by gearwheels on the shafts of both rotors, or otherwise.

The housing of the screw compressor element has an inlet close to one end of the rotors through which a gas to be compressed is drawn in (i.e. the inlet side of the compressor element) during the operation of the screw compressor, and this screw compressor element has an outlet close to the other end of the rotors through which compressed gas is expelled (i.e. the 'outlet side' of the compressor element).

As is known, when driving the rotors by means of the aforementioned motor, a gas or mixture of gases to be compressed, such as air, is drawn in at the aforementioned inlet by the meshing of the rotors and then compressed between the two rotors and finally driven out from the outlet side of the compressor element at a certain outlet pressure.

An axial gas force will thereby be exerted on the rotors, which during nominal operating conditions is directed from the outlet side to the inlet side, as the gas pressure on this outlet side is higher than the gas pressure on the inlet side. When starting up, this gas force is absent as at that time no gas is being compressed and the gas pressures on the inlet side and the outlet side are practically equal.

During operation of the screw compressor element, the rotors also experience axial forces that are exerted by the aforementioned motor on the drive gearwheel of one of the two rotors, such as is the case for example with an oblique or helical toothing of the drive gearwheel, and/or when there is a gearwheel transmission between the rotors, due to the axial forces attributable to the torque transmission between the gearwheels of this gearwheel transmission.

The resulting axial forces that act on the rotors can change direction during operation of the screw compressor, such that during starting up the forces exerted by the gearwheels, or more generally by the drive, can have the upper hand, whereas during nominal operation of the screw compressor element, the gas forces are generally more pronounced and determine the direction of the resulting axial forces.

Due to this reversal of the direction of the resulting axial forces, it is consequently necessary for the axial forces to be able to be accommodated in each direction, in order to immobilise the rotors in the housing as much as possible, on the one hand in order to avoid undesired leakage losses arising through the axial head clearance between the head surface of the rotors, and the corresponding head surface of the outlet side of the housing being too large, and on the other hand to avoid one of the head surfaces of the rotors coming into contact with the housing, which would lead to undesired friction and wear.

From EP 0.867.628 applications are also known in which the head surface clearance is kept constant, whereby the clearance is measured by a sensor and the rotor can be moved in the axial direction by means of a dual-action magnetic actuator that moves the rotor in the one or the other direction when the clearance deviates from the set desired value.

Such applications are rather complex and expensive.

Other applications are also known in which the rotor is kept in place in the axial direction by applying dual-action axial bearings, for example four-point contact bearings, that can accommodate the forces on the rotor in both directions.

However these dual-action axial bearings have an inherent axial play. As a result, when the resultant forces on the rotors reverse, the rotors can move over a distance which, neglecting the deformation of the bearings, is equal to this play.

When designing the compressor element this must be taken into account by providing a sufficiently large head clearance to avoid the rotor making undesired contact with the housing, which would then mean a loss of efficiency as a result of leakage losses.

Dual-action bearings also generate relatively large mechanical losses and churning losses as a result of the lubricants in the bearing being churned.

On the other hand, a certain inherent clearance in such dual-action bearings is necessary because if the clearance is too small, the risk of a three-point contact increases, which is undesired as in this case the risk of slipping in the bearing increases substantially, and consequently either excessive lubricant has to be applied, or the operating range of the compressor has to be limited, such that low loads at high speeds in particular are to be avoided.

Such compensating measures are already known in the form of a "balancing piston", as described in BE 1.013.221 for example, whereby a hydraulic or pneumatic piston is used to exert an axial force on the rotor concerned in order to counteract the gas forces acting on the rotor and thus to relieve the main bearing, such that a smaller bearing can be selected. The balancing piston is connected to the outlet of the compressor element, so that the force exerted by the balancing piston is proportional to the outlet pressure.

A disadvantage is the cost of such a balancing piston. Another disadvantage is that the main bearing always experiences the full load that is due to the resultant of the gas forces and the forces developed on the drive gearwheel and/or the gearwheel transmission between the rotors, such that the main bearing has to be designed for this.

One way to avoid the load on the main bearing changing direction is to provide a spring that exerts an elastic force on the rotor in the axial direction, in the opposite direction to the resulting forces on the gearwheels of the rotor concerned and in the same direction as the gas forces exerted on the rotor.

If this axial elastic force is sufficiently large to fully offset the resulting forces on the gearwheels of the rotor when starting up the compressor element, there will be no reversal of the resultant of the forces on the rotor, such that in this case a single-action axial bearing can suffice as the main bearing.

The aforementioned spring is affixed between the housing and the rotor concerned, and consequently requires the introduction of a supplementary axial bearing to transmit the axial elastic force between the stationary housing and the turning rotor.

This supplementary bearing has the disadvantage that it increases the cost and also brings about additional losses.

Although the spring prevents the direction of the load on the main bearing reversing during the start of the compressor element, this same spring will detrimentally increase the load on the main bearing during nominal operation as the resulting forces on the gearwheels of the rotor are at least partially cancelled out by the spring, and these resulting forces consequently can no longer counteract the gas forces during nominal operation to the same extent as in a situation without a spring.

SUMMARY

The purpose of the present invention is to provide a solution to at least one of the aforementioned and/or other disadvantages.

To this end the invention concerns a method for controlling a compressor element of a screw compressor, and the said compressor element has a housing with two meshing helical rotors in it that each contain a shaft with a helical rotor body on it, whereby the shaft of each rotor is supported in the housing in the axial direction by means of at least one axial bearing, and whereby the housing is provided with an inlet for gas at one end of the rotors and an outlet for gas at the other end of the rotors, called the inlet side and outlet side respectively, characterised in that this method comprises the steps of providing the compressor element with extra means that can exert an extra force on at least one axial bearing via the rotor, and whereby these means are formed by a least one magnet the magnetic force of which can act in the axial direction on at least one rotor of the compressor element and/or on an outer race of a second bearing that is affixed around this rotor; and that the effect of the aforementioned magnet or magnets can be switched on and off depending on the mode in which the compressor element is operating; and whereby this method comprises a process A and a process B whereby:

process A comprises a first step of switching on an aforementioned first magnet during start-up of the compressor element, such that this first magnet exerts a force on an aforementioned rotor that is directed from the outlet side to the inlet side, and of switching off this first magnet during nominal operation of the compressor element; and whereby process B comprises a first step of keeping an aforementioned second magnet switched off during start-up of the compressor element, and switching on this second magnet during nominal operation of the compressor element, such that this second magnet exerts a force that is directed from the inlet side to the outlet side.

Such a method according to the invention presents the advantage that, depending on the configuration, certain axial forces that act on the rotor, and thus on the axial bearings that support the rotor in the housing, can be at least partially or entirely compensated or even overcompensated, and that the load of the axial bearings can be optimised in all circumstances.

An advantage of compensating certain axial forces is that in this way certain axial bearings can be left out or replaced by smaller or less complex bearings that are less expensive and which also generate lower losses than the bearings that are used in modern screw compressor elements.

There is also a reduced need for abundant lubrication, which consequently brings about fewer churning losses.

The compensating means that are currently applied, such as compensation springs and balancing pistons, can be omitted or simplified, such that the cost can be drastically reduced.

An additional advantage is that the forces can be compensated by means of a magnet that does not generate any extra mechanical loss or resistive torque.

A further advantage of the invention is that it enables greater compensating forces to be placed on the rotor than is practically feasible today, due to the current limitations of a supplementary axial bearing, mechanical losses and lifetime limitations in the event of large forces, for example.

As a result of these greater forces the axial main bearing can operate in more favourable conditions. In this way the invention enables this main bearing, and consequently the compressor, to operate in different conditions than is practically feasible today, such as at high speeds for example.

In this way the invention also enables more suitable axial main bearings to be selected for a certain application, such as smaller and thus cheaper main bearings for example.

Moreover, the invention can also be applied to high-pressure and low-pressure compressor elements, and in both oil-lubricated and oil-free screw compressors, and this notwithstanding the unfavourable environment, the high levels of forces, the limited available space for installation, and the complexity that would deter many a constructor from arriving at a solution such as the one of the invention described here.

Other advantages will become clear in the description of the different variants of screw compressor elements according to the invention on the basis of the drawings, whereby magnets can be used, whether or not in combination with other compensating measures.

Preferably the magnet or magnets used have their NS axis oriented parallel to the axial direction of the rotors, in order not to generate any resistive torque or only a very limited resistive torque.

The effect of the magnet or the magnets can be switched on and off for example, depending on the operating mode of the compressor element, for example when starting up or at nominal operation at full load, or when changing the mode to a lower load, such that the compensating effect can be adapted to the operating mode, and more specifically to the axial forces arising as a function of the operating mode.

Thus the method can also include a second step in process A which, while the compressor element is operating, switches on the aforementioned first magnet in the event of a transition of this compressor element from partial load or full load to zero load, or in the event of a transition from full load to partial load.

Additionally when the method comprises process A and process B, the aforementioned second step of process A can also consist of switching off the aforementioned second magnet in the event of a transition of this compressor element from partial load or full load to zero load, or in the event of a transition from full load to partial load.

This provides the advantage that the gas forces can be better compensated at partial load and zero load.

This can be realised in a simple way, for example by constructing the magnet or magnets as electromagnets with a constant or adjustable magnetic field whose power supply can be switched on and off.

According to a specific aspect of the invention, the axial force exerted on the rotor by one or more magnets is adjusted or controlled by means of a control system, which will control the magnetic force exerted as a function of a system parameter such as the bearing load, the speed of the compressor element, the bearing temperature, the outlet pressure, the pressure ratio across the compressor element and/or the inlet pressure, such that the axial forces on a bearing stay within the operating region of the bearing concerned, such that this operating region is a known fact that is indicated by the bearing manufacturer in the form of a graph of the permissible forces in the axial direction as a function of the speed.

In this way the operating region of the bearings, and thus also the compressor element, can be extended without the risk of undesired damage to the bearings.

BRIEF DESCRIPTION OF THE DRAWINGS

With the intention of better showing the characteristics of the invention, a few preferred applications of a method according to the invention for controlling a screw compressor are described hereinafter by way of an example without any limiting nature, with reference to the accompanying drawings, wherein.

DETAILED DESCRIPTION OF VARIOUS EMBODIMENTS OF THE DISCLOSURE

Figure 1:
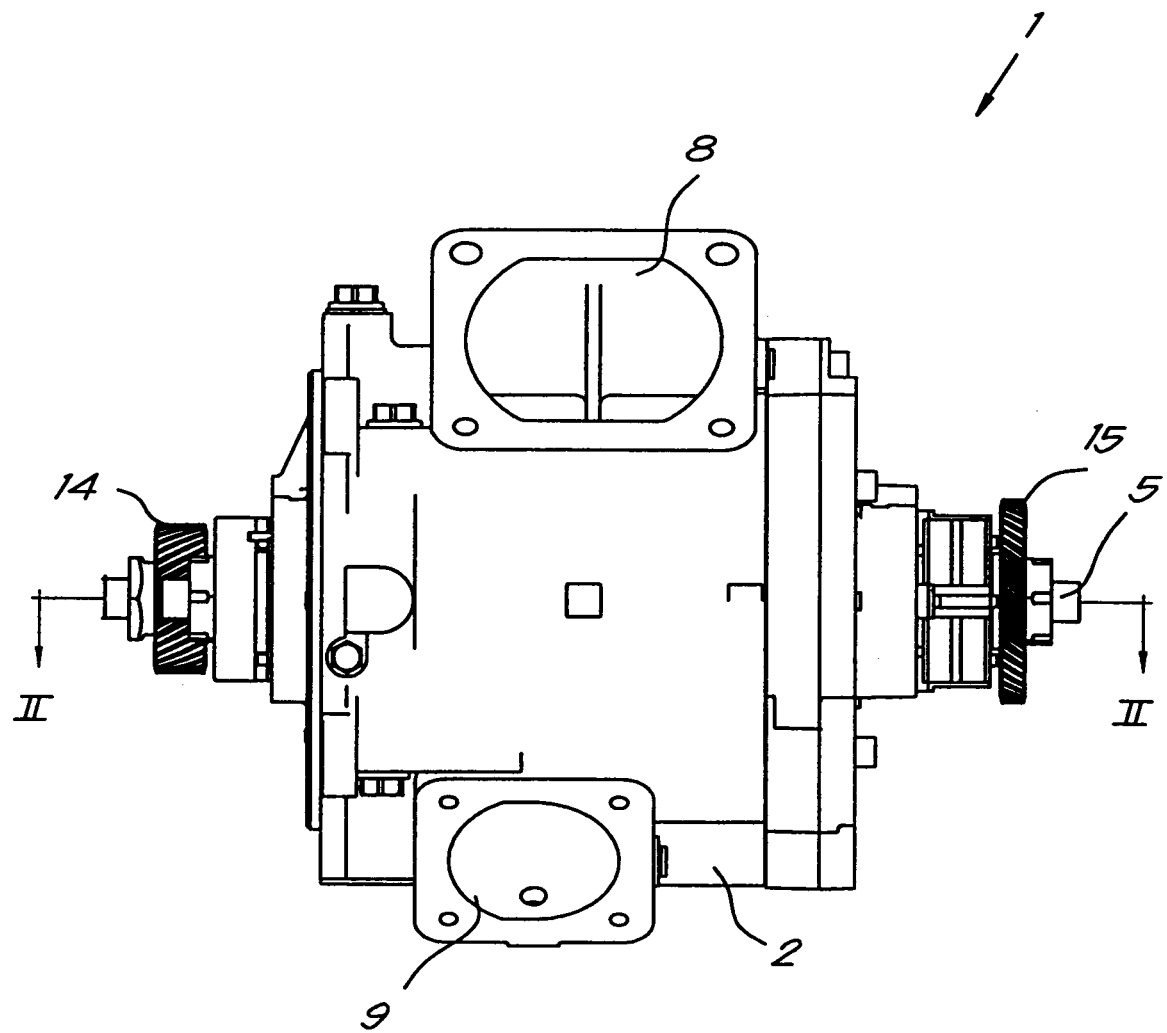
FIG. 1 shows a side view of a screw compressor element that is adapted for the application of a method according to the invention.
Figure 2:
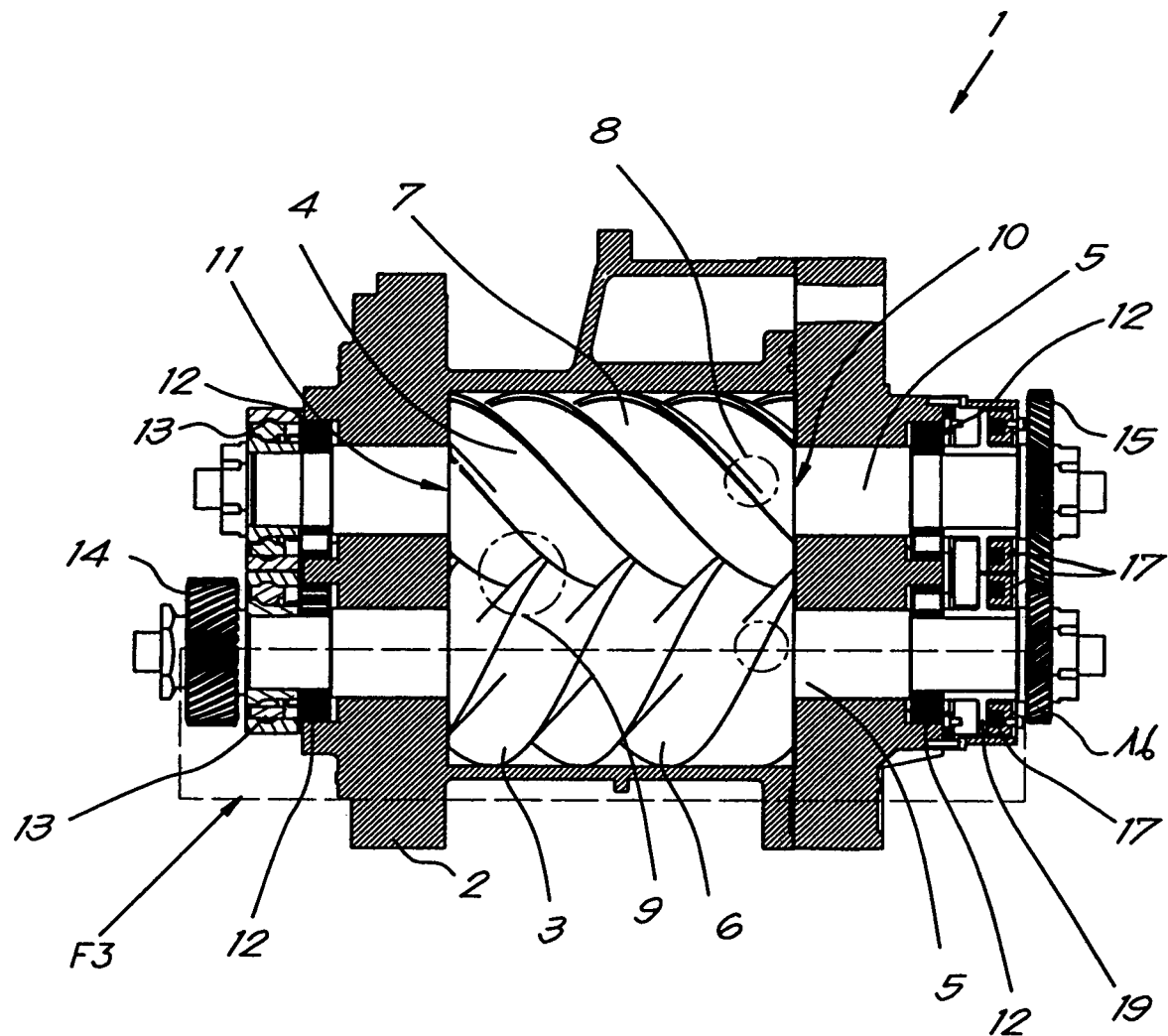
FIG. 2 shows a cross-section according to the line II-II of FIG. 1.

The compressor element 1 according to the invention shown in FIGS. 1 and 2 is a compressor element 1 of a screw compressor, whereby this compressor element 1 has a housing 2 with two meshing rotors in it, respectively a male rotor 3 and a female rotor 4, which contain a shaft 5 with a respective helical rotor body 6 or 7 on it.

The housing 2 has an inlet 8 through which a gas to be compressed can be drawn in, and an outlet 9 through which the gas can be expelled after having been compressed between the rotors 3 and 4.

This inlet and outlet, respectively 8 and 9, are at a respective end of the rotors 3 and 4, and which end is respectively labelled as the inlet side 10 and outlet side 11 of the compressor element 1.

The shaft 5 of each rotor 3 and 4 is supported in the housing 2 by means of a radial bearing 12 at each end of the aforementioned shaft 5 and by means of just one single axial bearing 13 on the aforementioned outlet side 11, and this single axial bearing 13 is often called the main bearing or axial main bearing.

The end of the male rotor 3 on the outlet side 11 has a drive gearwheel 14, with which this rotor 3 can be driven by means of a motor or other drive, which is not shown. The end of the female rotor 5 at the inlet side 10 has a first synchronisation gearwheel 15 that can mate with a second synchronisation gearwheel 16 that is at the end of the inlet side 10 of the male rotor 3, and which together form a gearwheel transmission 15-16 for the drive of the female rotor 4 by the male rotor 3, whereby this gearwheel transmission 15-16 ensures that the two rotors 3-4 do not touch one another.

However, applications are also known where this last gearwheel transmission 15-16 is not present and the male rotor 3 drives the female rotor 4 through direct contact between the rotor bodies 6 and 7.

The compressor element 1 for the application of the invention has extra means in the form of a first magnet 17 that is defined by the fact that its magnetic force acts in the axial direction on a rotor 3-4 of the compressor element 1 during operation, in order to be able to exert an extra axial force, by means of this magnet 17 via the rotor 3-4 concerned, on the main bearing 13 of this rotor 3-4.

In the example shown in FIGS. 1 and 2, both rotors 3-4 have such a first magnet 17, more specifically an electromagnet whose north-south axis 18 is parallel to the axial direction X-X' of the rotors 3-4, and which can engage with a disk 19 that is securely mounted on the shaft 5 transversely to the axial direction X-X' of the rotors 3-4.

Preferably the first magnet 17 is a ring magnet that is centred around the shaft 5 of the rotor 3-4 concerned, and whose power supply can be switched on and off in order to switch the effect of the magnet 17 on or off. In this case the first magnet 17 is a simple electromagnet 17, which, when switched on, generates a constant magnetic field.

Figure 3:
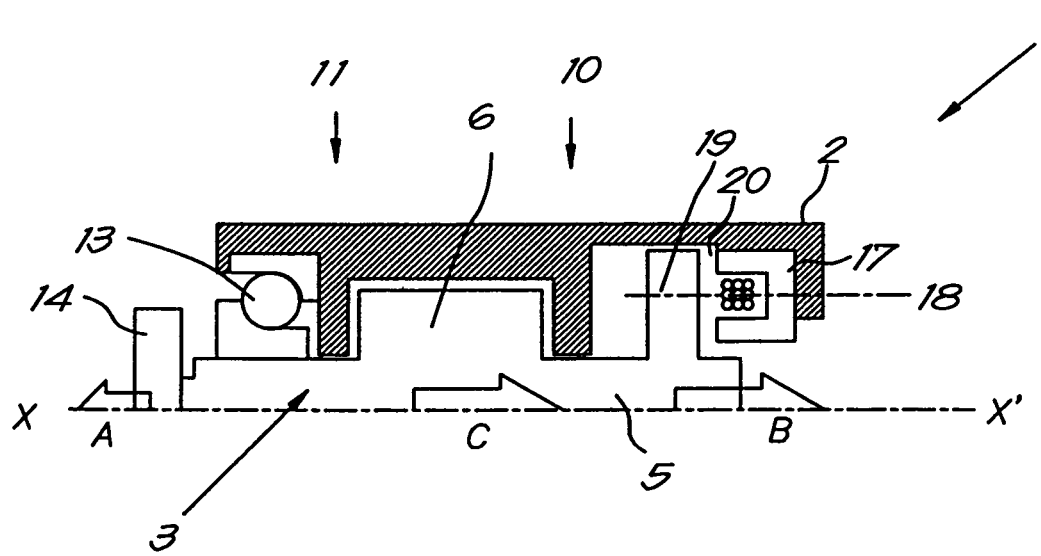
FIG. 3 schematically shows the arrangement of the part designated in FIG. 2 by the box F3.

In FIG. 3 the framed part of the male rotor 3, which is designated by F3 in FIG. 2, is schematically shown with the omission of the radial bearings and the gearwheel transmission 15-16 between the two rotors 3-4, and this for the purpose of simplicity. The corresponding parts in FIG. 3 are numbered in the same way as in FIG. 2.

FIG. 3 shows that the axial main bearing 13 is a single-action bearing in this case, in other words a bearing 13 that can only accommodate the axial forces in one single direction, and which in this case is mounted such that it can accommodate the axial forces on the rotor that are directed from the outlet side 11 to the inlet side 10 of the compressor element 1, more specifically from left to right in the drawing, whereby this bearing 13 is unable to accommodate the axial forces on the rotor 3 in the opposite direction.

The operation of the compressor element 1 is simple and as follows.

When starting up the compressor element 1, the rotor 3 will be driven by means of an external drive via the aforementioned drive gearwheel 14.

As in the example shown the drive gearwheel 14 is provided with an oblique toothing, as a result of the external drive an axial force will be exerted on the drive gearwheel 14, and thus on the rotor 3, which in the example is directed from the inlet side 10 to the outlet side 11, as shown by the arrow A.

At the same time, when starting up, in a first step of a process A of the method, the first magnet 17 is energised whereby, as shown in FIG. 3, the first magnet 17 is oriented such that when switched on it exerts a force on the rotor 3 that is directed from the outlet side 11 to the inlet side 10 of the compressor element, more specifically from left to right in FIG. 3, as shown by the arrow B in this figure, and thus in other words in the opposite direction to the force exerted on the rotor 3 via the drive gearwheel 14.

When starting up there are no other forces that act on the rotor 3, and the position of the rotor 3 is thus determined by the action of the resulting force on the axial bearing.

The axial force exerted by the first magnet 17 on the rotor 3 must be greater than the axial force developed on the drive gearwheel 14, all this to prevent the drive gearwheel 14, when starting up the compressor element 1, pulling the rotor 3 to the outlet side 11 and undesired contact thus occurring between the head surface of the rotor 3 on the outlet side 11 and the housing 2.

When the compressor element 1 is driven further, the gas that is drawn in via the inlet 8 will be compressed between the rotors 3-4 and expelled via the outlet 9, whereby the compressed gases will exert a force on the rotor 3 that is directed from the outlet side 11 of the compressor element 1 to the inlet side 10, as shown by arrow C in FIG. 3.

The gas forces thus add to the forces exerted by the first magnet 17, whereby these gas forces in nominal operation are greater than and opposite to the forces on the drive gearwheel 14 or the resulting forces on the drive gearwheel 14 and/or any gearwheels 15-16 of the gearwheel transmission between the rotors 3-4.

During nominal operation the first magnet 17 can then be switched off without the risk of the head surface of the rotor 3 being pulled against the housing on the outlet side 11.

An advantage of this embodiment is that, for the axial bearing support of the rotor 3, only a relatively small and cheap axial bearing 13 is required, consequently with low mechanical losses and churning losses due to the flow of lubricants through the bearing 13.

Moreover, the head clearance between the head end of the rotor 3 and the housing 2 remains relatively constant, as the resulting forces on the rotor 3 are always directed in the same direction and the clearance is thus only affected by the internal elastic deformations in the bearing 13.

Optionally, according to a second step of process A of the method, when the load of the compressor element 1 decreases from its nominal operating point, for example from full load to partial load or zero load, or from partial load to zero load, the first magnet 17 can be switched on.

This can prevent the drive force A gaining the upper hand due to the decreasing gas forces C as a result of the decrease of the load during start-up, with the risk of the rotor 3 being pulled against the head surface of the housing 2 on the outlet side 11.

At zero load an advantage is that the bearings always experience a sufficient load to prevent slipping It is clear that the aforementioned first magnet 17 can be a permanent magnet, whereby there is a possibility of control or adjustment to make the distance to the rotor 3 or the disk 19 variably adjustable in order to be able to adjust the width of the air gap 20, such that the magnet 17 can then be moved axially with respect to the rotor 3.

It is also clear that there does not have to be an extra disk 19 on the rotor, but that according to a variant, the magnet 17 could also act directly on the rotor 3 or a part of it, such as on the shaft 5 or on a rotor body 6-7 or a gearwheel 14-15-16 of the rotor 3-4 or a flange that is affixed over the shaft 5 and secured in an axial direction on this shaft 5 and/or on an outer race of a second bearing that is affixed around this rotor.

On the other hand, it is not excluded that the magnet 17 may be built in or mounted on the rotor 3, for example in the aforementioned disk 19, whereby the magnet 17 is then enclosed in or on the rotor with respect to a part of the housing 2.

Practice shows that the closer the disk 19 is to the main bearing 13 in the axial direction, the more stable the control will be and the lower the thermal side effects will be.

Figure 4:
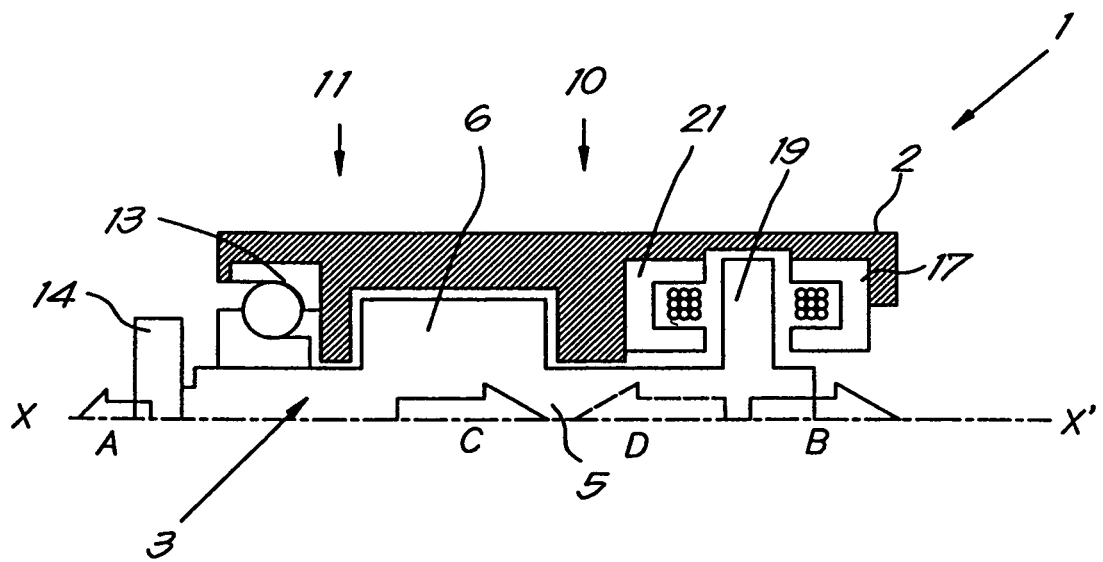
FIGS. 4 to 7 each show a view as in FIG. 3, but for a few variants of a compressor element adapted for the application of an alternative method according to the invention.

FIG. 4 shows a variant of a compressor element 1 that differs from the embodiment of FIG. 3 in that, in this case, a so-called second magnet 21, more specifically an electromagnet, is added to the other side of the disk 19 of the rotor 3, and which is defined by the fact that during operation it can exert an opposite force with respect to the magnet 17 of FIG. 3, as shown by the arrow D in FIG. 4, in other words a force D that is directed from the inlet side 10 to the outlet side 11.

The use and operation will in this case be identical to that of the previous embodiment, whereby in this case too, according to a first step of process A, the first magnet 17, while starting up, will be switched on and when nominal operation is reached it will be switched off again, whereas according to a first step of a process B of the method, the second magnet 21 will be switched on and off inversely, i.e. switched off or kept switched off when starting up and switched on at nominal operation.

As a result, during nominal operation the axial gas forces on the rotor 3 will at least be partially compensated by the influence of the second magnet 21, such that the main bearing 13 has to accommodate lower axial forces and can thereby be chosen as a smaller axial main bearing 13, thus with lower losses as a result.

In this case too, optionally, according to a second step of process A, the first magnet 17 can be switched, on and/or the magnet 21 can be switched off according to a second step of process B, when the load of the compressor element 1 decreases.

It is clear that the designation of first and second magnet do not stipulate the number of magnets in place, but rather stipulate the type of magnet according to the direction of the magnetic force that it exerts.

Figure 5:
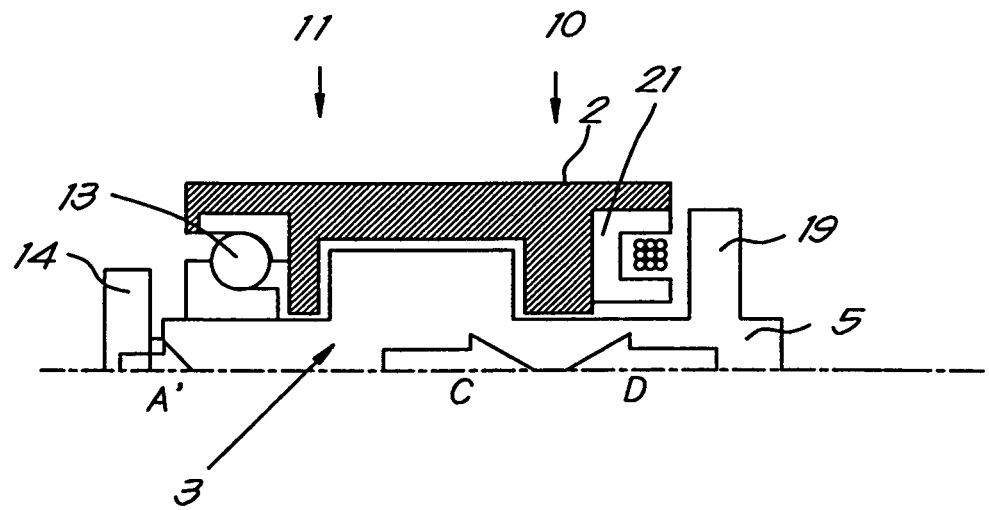

FIG. 5 shows a different application according to the invention where in this case the drive gearwheel 14 has different toothing, whereby in this case the axial forces transmitted to the rotor 3 via this drive gearwheel 14, or via any other drive in general, will be in the reverse direction with respect to the situation in FIGS. 3 and 4, and thus in this case directed from the outlet side 11 to the inlet side 10, as shown by arrow A' in FIG. 5.

Furthermore the compressor element 1 only has one single second magnet 21, which, just as is the case of FIG. 3, during operation exerts a force on the rotor 3 that is in the opposite direction to the force exerted by the drive gearwheel 14 on the rotor 3, and which thus in this case exerts a force that is directed from the inlet side 10 to the outlet side 11, as shown by arrow D in FIG. 5.

When starting up, this magnet is switched off or kept switched off, while it is switched on at nominal operation of the compressor element 1 in order to compensate the gas forces C.

In this case too, a smaller axial main bearing 13 can be selected.

In this case, the method only comprises a process B, without the application of process A.

If required, in a second step the magnet can be switched off in the event of a decrease of the load of the compressor element 1.

Figure 6:
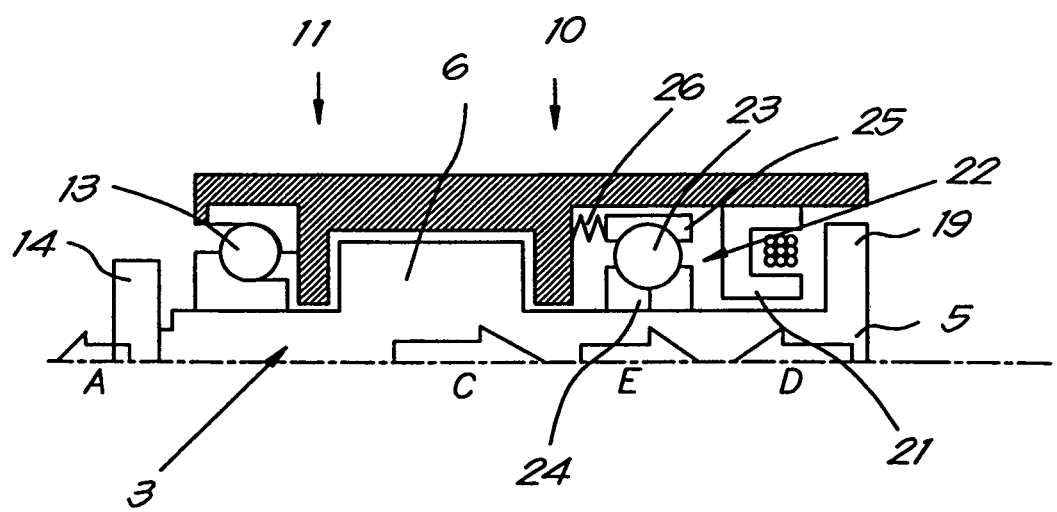

A further embodiment of a compressor element 1 according to the invention is shown in FIG. 6, where in this case there is an additional bearing 22 on the inlet side 10 of the rotor 3, which in this case, but not necessarily, is a dual-action bearing with roller elements 23 between an inner race 24 and outer race 25, where the inner race 24 is secured to the shaft 5 of the rotor 3 and the outer race 25 can be moved axially in the housing 2, and whereby between the outer race 25 and the housing 2 there is a spring 26 that exerts an axial force on the rotor 3 via the bearing 22, directed from the outlet side 11 to the inlet side 10, as shown by arrow E in FIG. 6.

In this case there is also a second magnet 21, which, during operation, can exert an axial force on the rotor 3 in the direction of arrow D in FIG. 6, and which is thus in the opposite direction to the force exerted by the spring 26 on the rotor 3.

In this case, when starting up the spring 26 prevents the head end of the rotor 3 on the outlet side 11 being pulled against the housing 2 due to the development of the force from the drive gearwheel 14.

During nominal operation, however, the gas forces will have the upper hand with respect to the forces developed by the drive gearwheel 14, and consequently the axial elastic force will constitute an extra load for the axial main bearing 13, and this extra load of the spring 26 can be compensated by switching on the second magnet 21, which then at least partially compensates or even overcompensates the elastic force, such that not only is the elastic force eliminated, but also a part of the gas forces are compensated.

In the event of a reduction of the load of the compressor element 1, the method according to the invention can switch off the second magnet 21.

The bearing 22 shown in FIG. 6 can, according to a variant of a compressor element for the application of the invention not shown in the drawings, simultaneously act as the aforementioned second bearing, whereby the magnet 21 acts on the outer race of this bearing 22, but, it is also possible for two separate bearings to be used, respectively a bearing on which the magnet 21 acts and a bearing on which the spring 26 acts.

Figure 7:
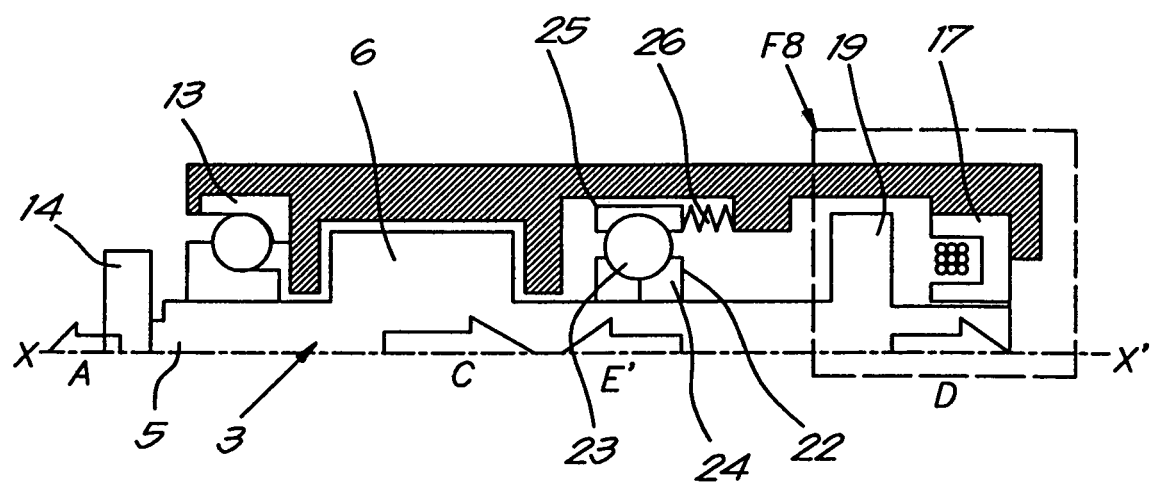

Another embodiment is shown in FIG. 7 where in this case the elastic force and the force developed by the magnet are inversely oriented with respect to the situation in FIG. 6.

In this case when starting up, the axial force of the spring 26 will be compensated or even overcompensated by switching on a first magnet 17, in order to pull the rotor 3 against the force of the drive gearwheel 14 away from the head surface of the housing 2 to the outlet side 11.

When the compressor element 1 is driven further, the first magnet 17 can then be switched off, after which the spring 26 relieves the main bearing 13 with a constant force. This provides the advantage that during nominal operation there are no magnetic forces, while the main bearing 13 is still greatly relieved.

In the event of a decreasing load of the compressor element 1 the first magnet 17 can be switched on.

Figure 8:
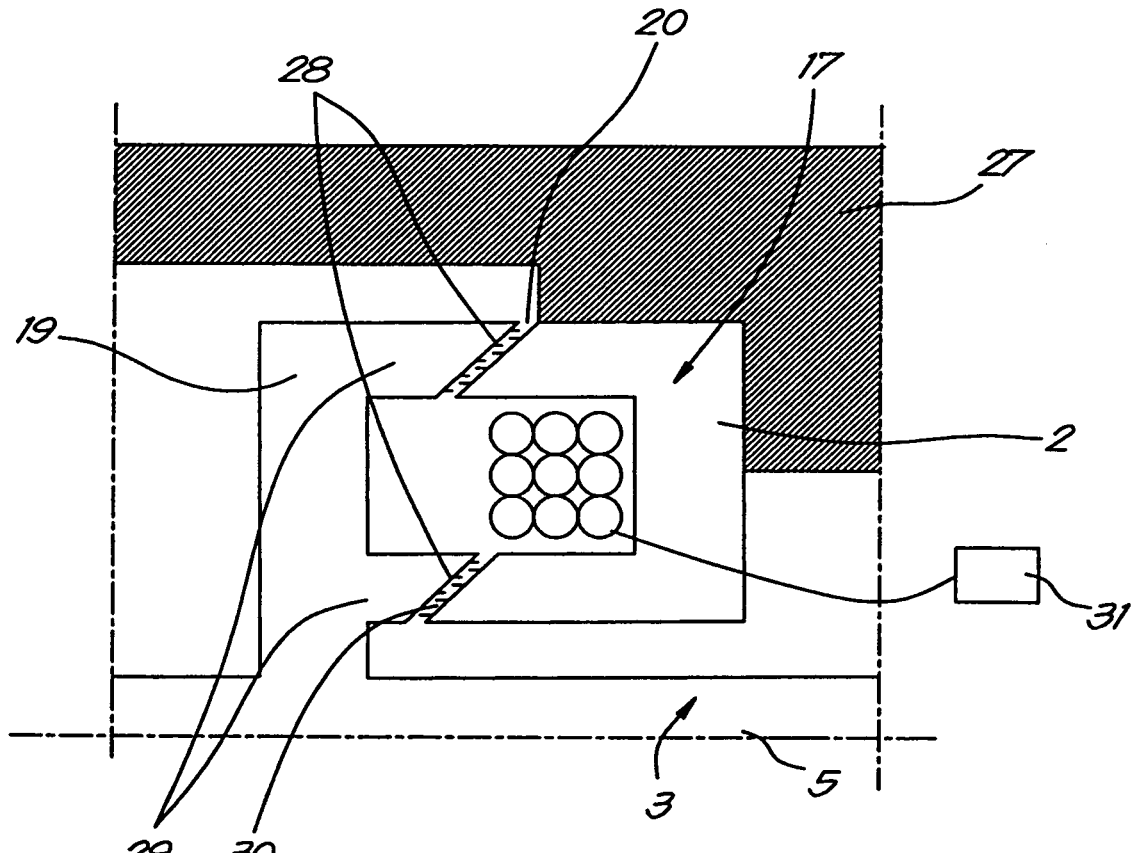
FIGS. 8 and 9 show two variants on a larger scale of the part indicated in FIG. 7 by F8.

FIG. 8 shows a variant of a magnet 17, more specifically an electromagnet, where in this case the air gap 20 between the U-shaped yoke 27 of the magnet 17 is not parallel to the transversely oriented disk 19, but rather extends obliquely with respect to the axial direction of the rotor 3. To this end, the free ends 28 of the arms of the yoke 27 are bevelled, and opposite these bevelled ends 28 there are ribs 29 on the disk 19 that are bevelled in the same way.

The advantage is that in this case the variation of the width of the air gap 20 is less than the axial movement of the rotor 3.

The aforementioned bevelled parts 28-29 also have a labyrinth seal 30, so that in this case the magnet 17 also plays a sealing role between the rotor 3 and the housing 2.

Figure 9:
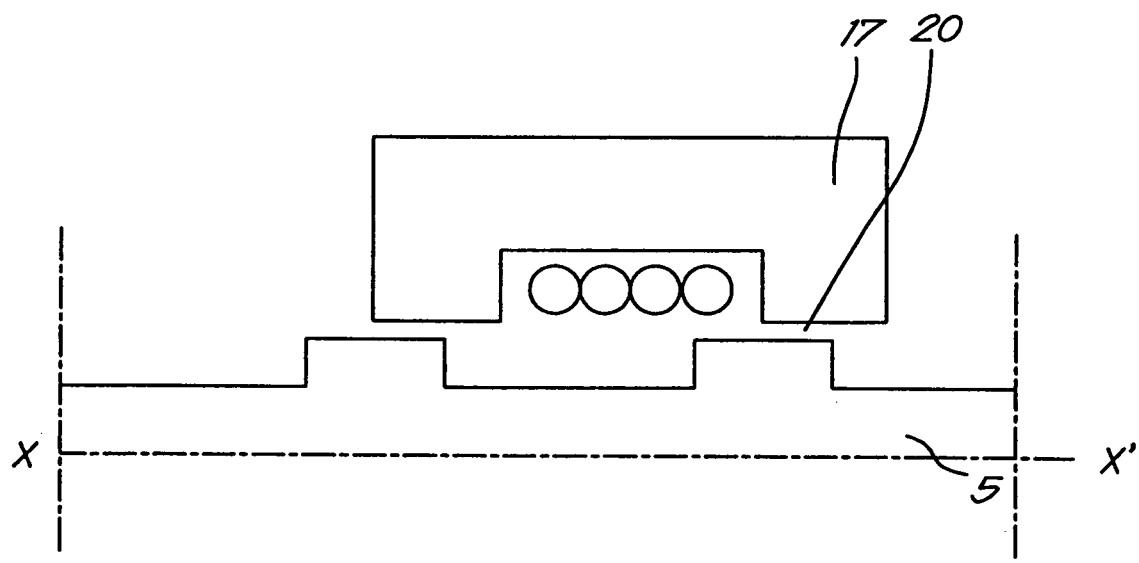

FIG. 9 shows a variant of a magnet 17, where in this case the air gap 20 is parallel to the axial direction X-X'.

According to a particular aspect of the invention, magnets 17-21 can be used whose effect on the rotor 3 is adjusted or controlled by means of a control system 31, as is shown schematically in FIG. 8, as a function of the operating conditions, whereby the magnets 17-21 will exert an extra axial force on the rotor 3, such that the resulting load of the bearing 13 is always within the operating region of the bearing 13 imposed by the manufacturer of the axial bearing 13.

Figure 10:
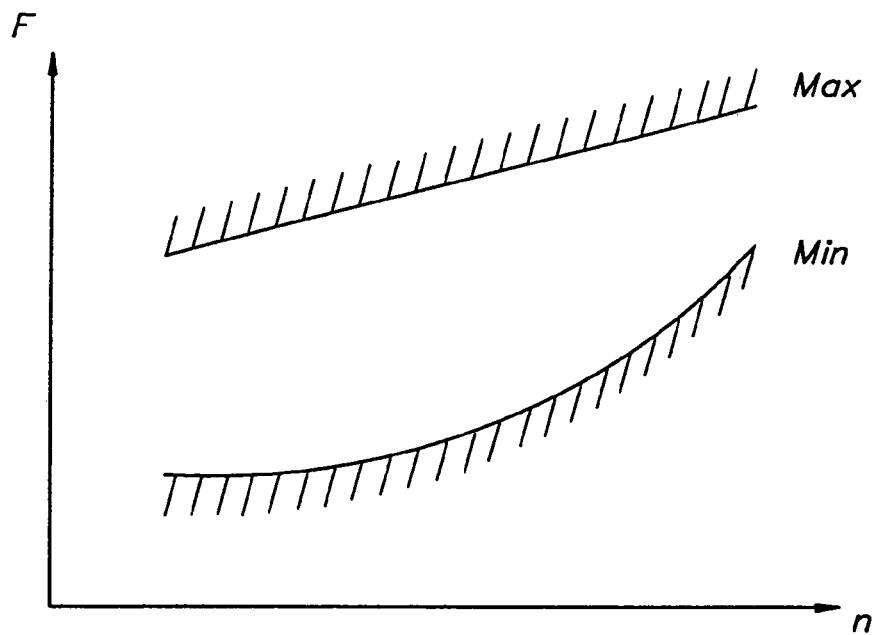
FIG. 10 shows a typical graph of the operating region of an axial bearing.

FIG. 10 shows an example of a graph that shows, for a certain axial bearing 13, the operating region with the allowed axial forces on the bearing 13 as a function of the speed, whereby this operating region is bounded by a lower limit curve "Min" and an upper limit curve "Max", whereby the upper limit curve depends on the allowed limiting stress.

The lower limit curve "Min" indicates when the contact angle differences exceed a maximum value, which is due to the kinematics of the bearing 13. At lower loads, thus below the "Min" curve, slip occurs in the bearing 13 such that wear can occur and mechanical losses increase.

Figure 11:
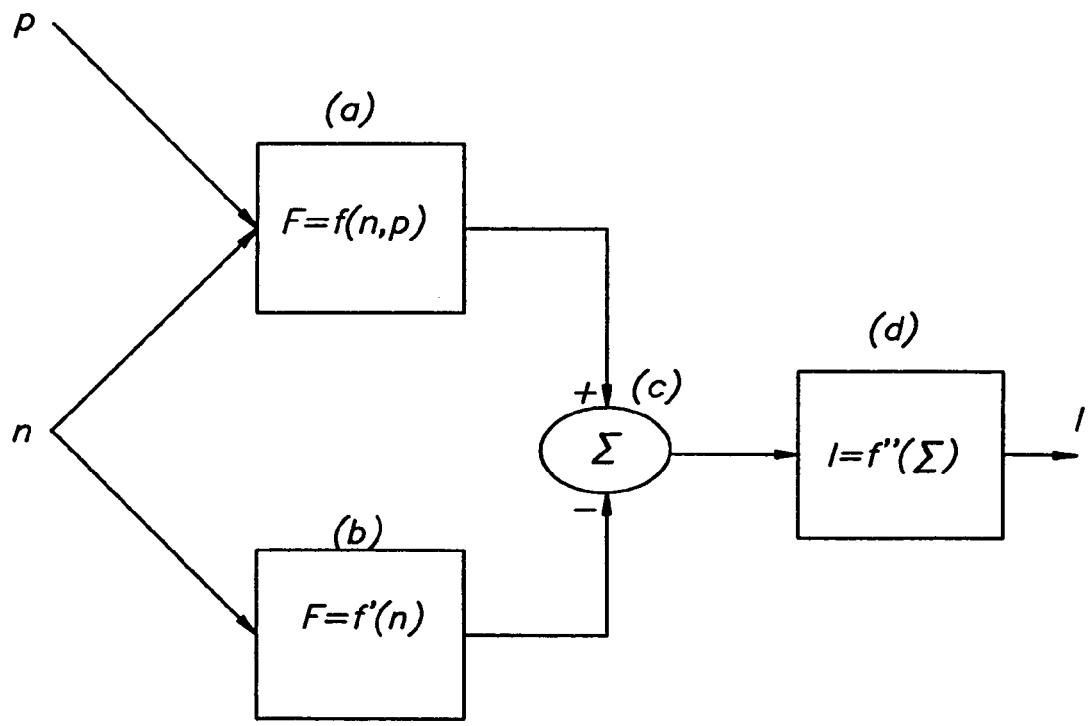
FIG. 11 and FIG. 12 show two possible control algorithms according to the invention.

An example of a control algorithm for controlling the force exerted on the rotor 3 by the magnet 17,21 is schematically shown in FIG. 11, where in a first step (a) the axial force exerted on the bearing 13 by the rotor 3 is determined on the basis of the compressor characteristic $F=f(n,p)$, and this on the basis of the measurements of the outlet pressure p and the rotational speed n, and in a second step (b) the maximum allowed axial force is determined from the graph of FIG. 10 on the basis of the measured rotational speed, after which the two values are compared to one another in step (c), all such that when there is a difference, the current I through the magnet 17,21 is adjusted in step (d) to eliminate the difference.

In so doing it is ensured that the bearing 13 can always be loaded to the maximum without going outside the operating region of the bearing 13, such that the bearing 13 is always loaded to the optimum and consequently an overdimensioned bearing 13 does not have to be selected with an excessive safety margin to be certain that the maximum limits of the axial forces are never exceeded.

It is clear that the technical control chart shown in FIG. 11 relates to continuous control in which a certain desired value is aimed for.

Figure 12:
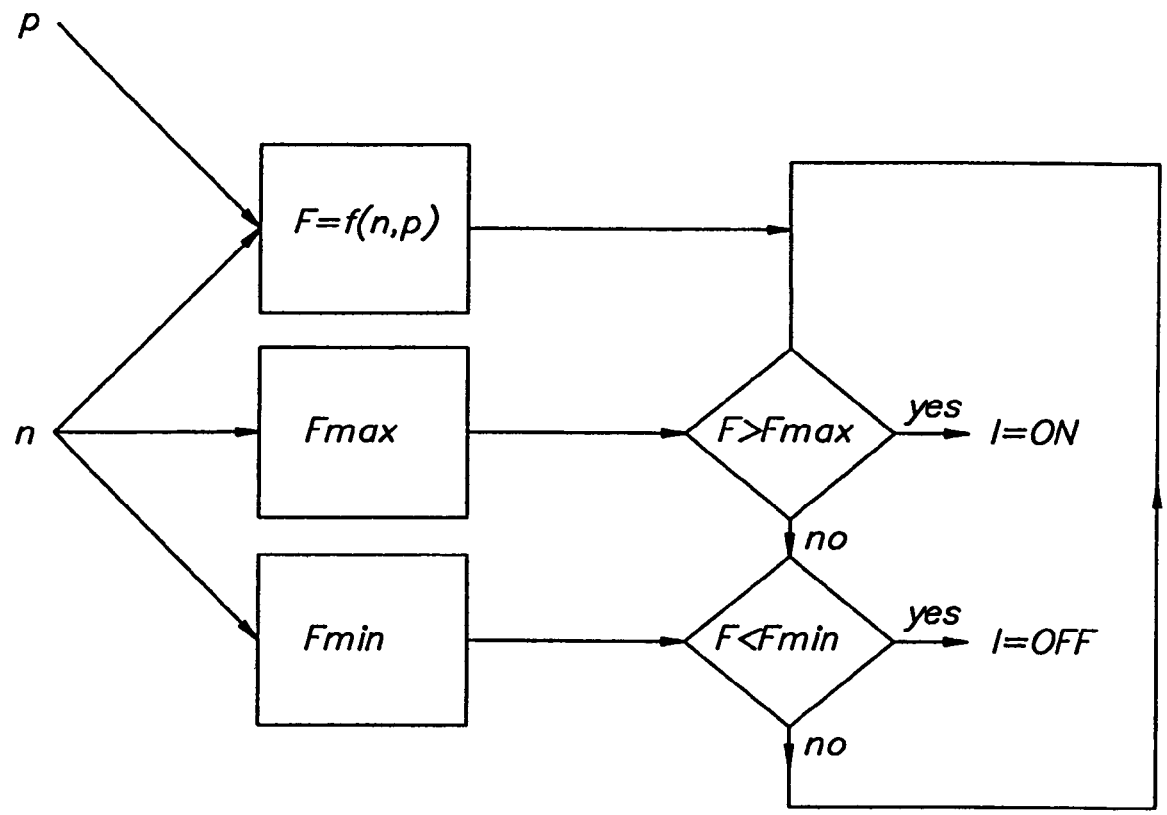

An alternative control that can be applied is shown in FIG. 12, in which an ON-OFF control is applied that differs from the control of FIG. 11 in that, in the case of FIG. 12, the maximum allowed axial force Fmax and the minimum allowed force Fmin are determined from the graph of FIG. 10, and the current I through the magnet 17, 21 is switched on when the axial force F determined according to the compressor characteristic $F=f(n,p)$ is greater than Fmax and the current I through the magnet 17, 21 is switched off when the axial force F determined according to the compressor characteristic $F=f(n,p)$ is less than Fmin.

The present invention is by no means limited to the applications of a method according to the invention described as an example and shown in the drawings, but a method according to the invention can be realised in all kinds of variants, without departing from the scope of the invention.

The invention claimed is:

1. Method for controlling a compressor element of a screw compressor, said compressor element having a housing, two meshing helical rotors positioned in the housing, each helical rotor having a shaft with a helical rotor body, wherein the shaft of each helical rotor is supported in the housing along the axial direction by at least one axial bearing, and wherein the housing is provided with an inlet for a gas to be compressed at one end of the helical rotors and an outlet for the compressed gas at the other end of the helical rotors, said method comprising the steps of:

providing the compressor element with a device configured to exert an extra force on the at least one axial bearing via the rotor, wherein the device configured to exert the extra force comprises at least one of a first magnet and a second magnet, said at least one magnet having a magnetic field exerting a force acting in the axial direction on at least one of the helical rotors of the compressor element or on an outer race of a second bearing that is affixed around the helical rotor, wherein said force of said magnetic field of the at least one magnet is selectively operative depending on the mode in which the compressor element is operating; and employing the force of the at least one magnet according to at least one of the following processes:

a process A comprising a first step of employing the force of the magnetic field of the at least one first magnet during start-up of the compressor element such that said first magnet exerts a force on at least one of the helical rotors directed from the outlet side to the inlet side, and rendering inoperative the force of the magnetic field of said first magnet during nominal operation of the compressor element, and a process B comprising a first step of maintaining the force of the magnetic field inoperative of the at least one second magnet from at least one of the helical rotors during start-up of the compressor element, and employing the force of the magnetic field of the second magnet during nominal operation of the compressor element such that the second magnet exerts a force on at least one helical rotor directed from the inlet side to the outlet side.

2. The method according to claim 1, wherein process A comprises a second step of, while the compressor element is operating, employing the force of the magnetic field of the first magnet in the event of a transition of the compressor element from partial load or full load to zero load, or in the event of a transition from full load to partial load.

3. The method according to claim 2, wherein the method is operated in process A and process B, and wherein the second step of process A also includes the step of rendering inoperative the force of the magnetic field of the second magnet in the event of a transition of the compressor element from partial load or full load to zero load, or in the event of a transition from full load to partial load.

4. The method according to claim 1, wherein the at least one magnet generates a constant magnetic field during operation.

5. The method according to claim 1, wherein the at least one magnet is an electromagnet.

6. The method according to claim 1, wherein the axial force exerted on the rotor by the at least one electromagnet during operation is adjustable or controllable.

7. The method according to claim 1, wherein the at least one magnet is movable with respect to the helical rotor to employ or render inoperative the force of the magnetic force of the first and/or second magnet or to adjust or control the axial force exerted on the helical rotor.

8. The method according to claim 1, wherein between at least one of the helical rotors and the first and/or second magnet there is an air gap, wherein said air gap extends obliquely with respect to the axial direction of the at least one helical rotor.

9. The method according to claim 1, wherein at least one of the helical rotors is supported along an axial direction by only a main bearing.

10. The method according to claim 9, wherein the main bearing is a single-action axial bearing configured to only accommodate the axial forces in one axial direction, either forces that are directed from the outlet side to the inlet side or forces directed from the inlet side to the outlet side.

11. The method according to claim 10, wherein the single-action axial main bearing is configured to only accommodate forces on the helical rotor that are axially oriented from the outlet side to the inlet side.

12. The method according to claim 9, further comprising a disk provided on at least one rotor, on which the force of the magnetic field of the at least one magnet is actable, wherein the disk is positioned as close as possible to the main bearing of the rotor along the axial direction.

13. The method according to claim 1, wherein at least one of the helical rotors has a drive gearwheel configured to be externally driven by a motor, and both helical rotors have an additional synchronisation gearwheel of a gearwheel transmission between the two rotors, wherein the force of the magnetic field of the at least one magnet acting on the rotor is oriented such that during operation the force of the magnet exerts a resulting force that is oriented in the opposite direction to the resultant of the axial forces that occur on the gearwheels of the rotor as a result of driving the compressor element via the drive gearwheel.

14. The method according to claim 1, wherein there is no spring in the compressor element that exerts an axial force on the rotor.

15. The method according to claim 1, further comprising a main bearing and a second axial bearing with two races between which there are roller elements, wherein a first race is secured axially to one of the helical rotors and a second race is movable axially in the housing, and between the housing and the second movable race a spring is provided to exert an axial force on the second movable race.

16. The method according to claim 15, wherein the force of the magnetic field of the at least one magnet exerts a resulting axial force that is in the opposite direction to the axial force exerted by the spring on the second movable race of the second axial bearing, and wherein said resulting axial force of the at least one magnet is of the same order of magnitude as, or greater than, the axial force exerted by the spring on the second movable race of the second bearing.

17. The method according to claim 16, wherein the spring exerts an axial force on the second movable race of the second axial bearing that is directed from the inlet side to the outlet side, wherein when starting up the compressor element the force of the magnetic field of the at least one magnet is employed to overcompensate the axial force of the spring, and wherein the force of the magnetic field of the at least one magnet is rendered inoperative during nominal operation.

18. The method according to claim 15, wherein the spring exerts an axial force on the second movable race of the second axial bearing that is directed from the outlet side to the inlet side, wherein, when starting up the compressor element, the force of the magnetic field of the at least one magnet is rendered inoperative from at least one helical rotor, and where the force of magnetic field of the at least one magnet is employed during nominal operation to compensate or overcompensate the axial force of the spring.

19. The method according to claim 1, further comprising a control system that adjusts or controls the magnetic force applied on the helical rotors by the at least one magnet and which controls the exerted magnetic force as a function of a system parameter, such that the magnetic forces acting on a bearing lie within the operating region of the bearing, wherein this operating region is a known fact of allowed forces as a function of the speed.

20. The method according to claim 19, wherein the system parameter, according to which the magnetic force is adjusted or controlled, comprises the bearing load, the speed of the compressor element, the bearing temperature, the outlet pressure, the pressure ratio across the compressor element and/or the inlet pressure of the compressor element.

21. The method according to claim 19, wherein the at least one magnet is an electromagnet.

22. The method according to claim 21, wherein the control system uses a control algorithm to control the magnetic force exerted on the helical rotor by the at least one magnet, wherein in a first step (a) determining a value of an axial force exerted by the rotor on the bearing on the basis of the known compressor characteristic of the compressor element, which is determined on the basis of measurements of the outlet pressure and the rotational speed;

in a second step (b) determining a value of the maximum allowed axial force of the operating region of the bearing on the basis of the measured rotational speed;

in a step (c) comparing a value of the axial force exerted by the rotor to the value of the maximum allowed axial force of the bearing to each other and determining the difference between the values; and in a step (d) adjusting current through the at least one magnet to eliminate the difference between the values.

23. The method according to claim 1, applied to a compressor element of an oil-free screw compressor.

24. The method according to claim 1, applied to a compressor element of a low-pressure screw compressor.

25. Method for controlling a compressor element of a screw compressor, said compressor element having a housing, two meshing helical rotors positioned in the housing, each helical rotor having a shaft with a helical rotor body, wherein the shaft of each helical rotor is supported in the housing along the axial direction by at least one axial bearing, and wherein the housing is provided with an inlet for a gas to be compressed at one end of the helical rotors and an outlet for the compressed gas at the other end of the helical rotors, said method comprising the steps of:

providing the compressor element with a device configured to exert an extra force on the at least one axial bearing via the rotor, wherein the device configured to exert the extra force comprises at least one of a first magnet and a second magnet, said at least one magnet having a magnetic field exerting a force acting in the axial direction on at least one of the helical rotors of the compressor element or on an outer race of a second bearing that is affixed around the helical rotor, wherein said force of said magnetic field of the at least one magnet is selectively operative depending on the mode in which the compressor element is operating; and employing the force of the at least one magnet according to at least one of the following processes:

a process A comprising a first step of employing the force of the magnetic field of the at least one first magnet during start-up of the compressor element such that said first magnet exerts a force on at least one of the helical rotors directed from the outlet side to the inlet side, and rendering inoperative the force of the magnetic field of said first magnet during nominal operation of the compressor element, and a process B comprising a first step of maintaining the force of the magnetic field inoperative of the at least one second magnet from at least one of the helical rotors during start-up of the compressor element, and employing the force of the magnetic field of the second magnet during nominal operation of the compressor element such that the second magnet exerts a force on at least one helical rotor directed from the inlet side to the outlet side, wherein the at least one magnet has a north-south axis oriented parallel to the axial direction of the helical rotors.

26. Method for controlling a compressor element of a screw compressor, said compressor element having a housing, two meshing helical rotors positioned in the housing, each helical rotor having a shaft with a helical rotor body, wherein the shaft of each helical rotor is supported in the housing along the axial direction by at least one axial bearing, and wherein the housing is provided with an inlet for a gas to be compressed at one end of the helical rotors and an outlet for the compressed gas at the other end of the helical rotors, said method comprising the steps of:

providing the compressor element with a device configured to exert an extra force on the at least one axial bearing via the rotor, wherein the device configured to exert the extra force comprises at least one of a first magnet and a second magnet, said at least one magnet having a magnetic field exerting a force acting in the axial direction on at least one of the helical rotors of the compressor element or on an outer race of a second bearing that is affixed around the helical rotor, wherein said force of said magnetic field of the at least one magnet is selectively operative depending on the mode in which the compressor element is operating; and employing the force of the at least one magnet according to at least one of the following processes:

a process A comprising a first step of employing the force of the magnetic field of the at least one first magnet during start-up of the compressor element such that said first magnet exerts a force on at least one of the helical rotors directed from the outlet side to the inlet side, and rendering inoperative the force of the magnetic field of said first magnet during nominal operation of the compressor element, and a process B comprising a first step of maintaining the force of the magnetic field inoperative of the at least one second magnet from at least one of the helical rotors during start-up of the compressor element, and employing the force of the magnetic field of the second magnet during nominal operation of the compressor element such that the second magnet exerts a force on at least one helical rotor directed from the inlet side to the outlet side, wherein the at least one magnet contains a seal with a gas-sealing function between the rotor and the housing.

27. The method according to claim 15, wherein the second axial bearing comprises a dual-action bearing.

* * * * *